C. S. POTTER.
Refining Oils.
No. 43,429.
Patented July 5, 1864.
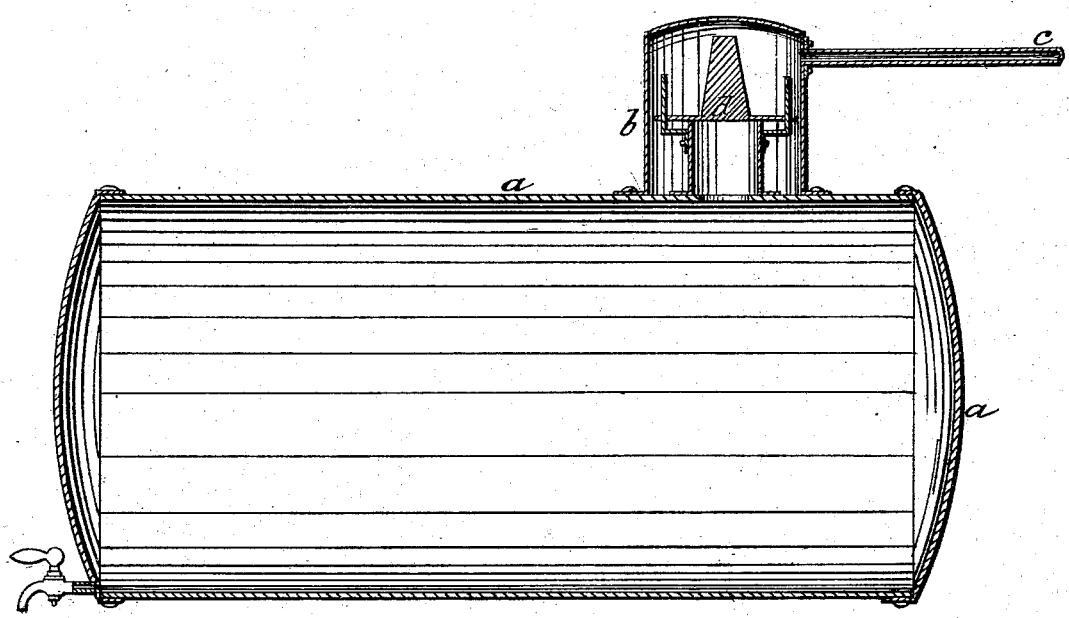
Witnesses;
Lemuel W. Serrell
Chas. H. Smith
Inventor,
Chas. S. Potter.

UNITED STATES PATENT OFFICE.

CHARLES S. POTTER, OF BROOKLYN, NEW YORK.

IMPROVEMENT IN PROCESSES OF TREATING PETROLEUM, &c.

Specification forming part of Letters Patent No. 43,429, dated July 5, 1864; antedated June 21, 1864.

*To all whom it may concern:*

Be it known that I, CHARLES S. POTTER, of Brooklyn, in the county of Kings and State of New York, have invented a certain new and useful Improvement in the Method of Treating Coal-Oils, Petroleum, and Similar Substances or Products for their Separation; and I do hereby declare the following to be a full, clear, and exact description of the said invention.

Coal-oil has been distilled, boiled, and otherwise treated by heat under atmospheric pressure and by a partial vacuum. In all such operations the more volatile portions are quickly evaporated, and the products obtained vary according to the heat to which the distilling or boiling vessel is from time to time raised. I have discovered that by confining such oils in a vessel until a certain pressure greater than the atmosphere is attained before the vapors are allowed to pass away the heat incident to such pressure will effect such a change in the coal-oil or similar material under treatment that a much less quantity of the less useful products—such as naphtha, benzine, tar-residuum, and coke—will be produced than by the ordinary operation under atmospheric pressure.

I employ any suitable still or heating apparatus in which the material to be operated on is placed. Such apparatus is to be provided with charging and delivery apertures, manholes, &c., of any well-known or desired character; and I provide any device—such as a safety-valve, small tubes, or a stop-valve—to detain the vapors in the heating apparatus until the required pressure shall accumulate and be maintained as the vapors pass away to the condensing apparatus.

I have represented in the annexed drawings a section of a heating-vessel, *a*, upon which is a dome, *b*, with a pipe, *c*, to the condensing apparatus, and within this dome is a seat around the orifice from the vessel *a*, upon which seat is a valve, *d*, with weights sufficient to keep the valve to its seat until the desired pressure is produced in the vessel.

I do not limit myself to any particular apparatus or device for heating the oil or maintaining the pressure.

In treating crude oil or petroleum I first heat the same carefully in the still to drive off the watery portions. This may be done under the pressure of the atmosphere or more. I then confine the vapors until about ten pounds pressure to the square inch is produced in the vessel. After which the vapors raise the valve and pass away and are condensed, as usual. This operation is continued until the oil passing over is at about 36° gravity. The fire may then be withdrawn and the contents of the still be allowed to cool. The still will be found to contain a dark green oil, free from earthy matters, especially adapted to lubricating purposes, and resembling in color and appearance the natural product known in commerce as the "mecca oil," but superior to it as a lubricator. This is to be drawn off or removed in any convenient manner. A deposit of coke and earthy matters will be found in the still; but the same is very easily removed, as it is not hard and solid, as in the ordinary still, where the oil is treated under atmospheric pressure. If the distillation were carried further, an oil of a yellowish character would be produced with greater specific gravity, and the lubricating-oil remaining would be denser. This yellow oil can be introduced into the still with a fresh charge of crude oil and be redistilled.

The tar or residuum from the distillation of illuminating-oil under the ordinary process, if subjected to a boiling operation under a pressure of about five pounds to the inch for a short time, will be found to have separated into lubricating-oil of the general character aforesaid and coke; and, if desired, the heavy yellow oil may be distilled to make a denser lubricating-oil.

By the process of heating or distilling coal-oils, petroleum, and similar substance or their products, I am enabled to obtain a larger proportion of oil adapted to illuminating purposes. I produce a less proportion of the light oils, such as naphtha, benzine, &c. I produce no tar or residuum in the process of distillation, and convert the said tar or residuum produced under other modes of distillation into a lubricating-oil, so that the real products of my process are illuminating-oil and lubricating-oil, the coke or earthy material and lighter oils being in small proportions. The coke, being looser and more porous than before, does not cause so much trouble in its removal, and does not cause so much injury to the still, as the coke heretofore formed a layer between the heat and the oil, and these results are attained by and in consequence of the employment of a greater pressure in the still than the atmosphere.

What I claim, and desire to secure by Letters Patent, is—

The method herein specified of treating coal-oil, petroleum, and similar substances or their products for their separation and purification, as set forth.

In witness whereof I have hereunto set my signature this 14th of November, 1863.

CHAS. S. POTTER.

Witnesses:
LEMUEL W. SERRELL,
CHAS. H. SMITH.